United States Patent
Jiang (10) Patent No.: US 10,875,712 B2
(45) Date of Patent: Dec. 29, 2020

(54) METHOD AND DEVICE FOR WAREHOUSE STORAGE SPACE PLANNING AND ELECTRONIC DEVICE

(71) Applicant: CAINIAO SMART LOGISTICS HOLDING LIMITED, Grand Cayman (KY)

(72) Inventor: Zhenlin Jiang, Hangzhou (CN)

(73) Assignee: Cainiao Smart Logistics Holding Limited, Grand Cayman (KY)

( * ) Notice: Subject to any disclaimer, the term of this patent is extended or adjusted under 35 U.S.C. 154(b) by 257 days.

(21) Appl. No.: 16/038,390

(22) Filed: Jul. 18, 2018

(65) Prior Publication Data

US 2018/0346244 A1    Dec. 6, 2018

Related U.S. Application Data

(63) Continuation of application No. PCT/CN2017/070908, filed on Jan. 11, 2017.

(30) Foreign Application Priority Data

Jan. 21, 2016    (CN) .......................... 2016 1 0040276

(51) Int. Cl.
*G06Q 10/00* (2012.01)
*B65G 1/137* (2006.01)
(Continued)

(52) U.S. Cl.
CPC .............. *B65G 1/1371* (2013.01); *G06N 3/08* (2013.01); *G06N 20/00* (2019.01); *G06Q 10/04* (2013.01); *G06Q 10/08* (2013.01); *G06Q 10/087* (2013.01)

(58) Field of Classification Search
CPC ................................ G06Q 10/04; G06Q 10/08
(Continued)

(56) References Cited

U.S. PATENT DOCUMENTS 6,315,513 B1    11/2001    Harukawa et al.
6,744,436 B1    6/2004     Chirieleison, Jr. et al.
(Continued)

FOREIGN PATENT DOCUMENTS

AU          164495 B2      8/2003
CM       104899720    *   9/2015
(Continued)

OTHER PUBLICATIONS

International Search Report and Written Opinion for Application No. PCT/CN2017/070908, dated Apr. 13, 2017, 9 pages.
(Continued)

*Primary Examiner* — Rokib Masud
(74) *Attorney, Agent, or Firm* — Sheppard Mullin Richter & Hampton LLP (57) ABSTRACT

A method for warehouse storage space planning comprises: obtaining warehouse goods change information of a predetermined time period and current storage space utilization information of a warehouse, wherein the predetermined time period is a future time period; extracting goods identifier and a quantity of goods to be stored within the predetermined time period from the warehouse goods change information of the predetermined time period; determining a storage attribute parameter of the goods to be stored within the predetermined time period based on the goods identifier of the goods to be stored within the predetermined time period; and determining a preset storage space in the warehouse for the goods to be stored within the predetermined time period based on the storage attribute parameter of the goods to be stored within the predetermined time period, the quantity of the to-be-stored goods, and the current storage space utilization information of the warehouse.

20 Claims, 2 Drawing Sheets

(51) Int. Cl.
*G06N 20/00* (2019.01)
*G06Q 10/08* (2012.01)
*G06N 3/08* (2006.01)
*G06Q 10/04* (2012.01)

(58) Field of Classification Search
USPC .......................................................... 705/28
See application file for complete search history.

(56) References Cited

U.S. PATENT DOCUMENTS

| | | | |
|---|---|---|---|
| 7,455,225 B1 | 11/2008 | Hadfield et al. | |
| 7,536,283 B2 | 5/2009 | Potter et al. | |
| 7,536,325 B2* | 5/2009 | Randell | G06Q 30/04 705/30 |
| 7,546,257 B2 | 6/2009 | Hoffman et al. | |
| 7,835,936 B2 | 11/2010 | Ouimet et al. | |
| 8,561,897 B2 | 10/2013 | Kunzig et al. | |
| 2002/0194126 A1* | 12/2002 | Randell | G06Q 30/04 705/40 |
| 2006/0259427 A1* | 11/2006 | Randell | G06Q 30/04 705/40 |
| 2008/0201274 A1* | 8/2008 | Podgurny | G06Q 30/0601 705/400 |
| 2010/0316470 A1 | 12/2010 | Lert et al. | |
| 2011/0106295 A1 | 5/2011 | Miranda et al. | |
| 2012/0101627 A1 | 4/2012 | Lert | |
| 2012/0126000 A1 | 5/2012 | Kunzig et al. | |
| 2014/0279294 A1 | 9/2014 | Field-Darragh et al. | |

FOREIGN PATENT DOCUMENTS

| | | | |
|---|---|---|---|
| CN | 101894314 | | 11/2010 |
| CN | 102103716 A | | 6/2011 |
| CN | 102194167 A | | 9/2011 |
| CN | 102332138 A | | 1/2012 |
| CN | 103473616 | | 12/2013 |
| CN | 103679418 | | 3/2014 |
| CN | 103942617 A | | 7/2014 |
| CN | 104021426 A | | 9/2014 |
| CN | 104899720 A | * | 9/2015 |
| CN | 104899720 A | | 9/2015 |
| CN | 104200348 B | | 10/2018 |
| EP | 2297005 B1 | | 2/2013 |
| JP | 2000351422 A | | 12/2000 |
| JP | 2003285906 A | | 10/2003 |
| JP | 3484104 B2 | | 1/2004 |
| JP | 2007210800 A | | 8/2007 |
| JP | 2010042909 A | | 2/2010 |
| JP | 2013193816 A | | 9/2013 |
| JP | 2015024869 A | | 2/2015 |
| JP | 5848268 B2 | | 1/2016 |
| JP | 6535632 B2 | | 6/2019 |
| RU | 146774 U1 | | 10/2014 |

OTHER PUBLICATIONS

International Preliminary Report on Patentability for International Application No. PCT/CN2017/070908 dated Aug. 2, 2018, 11 pages.
Office Action for Japanese Application No. 2018538154 dated Sep. 3, 2019, 8 pages.
Examination Report No. 1 for Australian Application No. 2017209149 dated Sep. 4, 2019, 4 pages.
First Search dated Mar. 14, 2020, issued in related Chinese Patent Application No. 201610040276.1 (1 page).
First Office Action dated Mar. 26, 2020, issued in related Chinese Patent Application No. 201610040276.1, with English machine translation (22 pages).

* cited by examiner

METHOD AND DEVICE FOR WAREHOUSE STORAGE SPACE PLANNING AND ELECTRONIC DEVICE

CROSS REFERENCE TO RELATED APPLICATIONS

The present application is a continuation application of the International Patent Application No. PCT/CN2017/070908, filed on Jan. 11, 2017, and titled "METHOD AND DEVICE WAREHOUSE STORAGE SPACE PLANNING AND ELECTRONIC DEVICE." The PCT Application PCT/CN2017/070908 claims priority to the Chinese Application No. 201610040276.1, filed on Jan. 21, 2016. The entire contents of all of the above applications are incorporated herein by reference in their entirety.

TECHNICAL FIELD

This application relates to a warehouse management technology, specifically to a method and a device for warehouse storage space planning, and also to an electronic device for warehouse storage space planning.

BACKGROUND

Placement of goods in storage spaces in a warehouse directly affects the efficiency of operations in the warehouse. Therefore, how to arrange the storage spaces is a very important issue. For example, among returned goods in the warehouse, goods of one category are usually returned in a large quantity while goods of another category are rarely returned. If fixed storage spaces are recommended only on a category basis, eventually, some storage spaces become filled with goods while some other storage spaces store only a few goods. Consequently, the warehouse space cannot be utilized effectively, and great inconvenience is brought to subsequent operations in the warehouse. In addition, although dispersing goods during goods storage prevents the storage spaces from being overflowed with goods, various goods have to be acquired from dispersed storage spaces for bulk shipment, which increases the workload of the warehouse operation, and reduces the work efficiency.

In most existing methods for warehouse storage space planning, some empirical parameters are set to limit the goods storage quantity of a storage space. For example, a maximum goods storage quantity of a storage space is specified, and if the quantity of goods in the storage space reaches a particular value, subsequent goods are stored in another storage space. For another example, a volume is specified for a storage space, and if a volume of goods stored in the storage space reaches a particular value, subsequent goods are stored in another storage space. For still another example, a storage load is specified for a storage space, and if a total weight of goods stored in the storage space reaches a particular value, subsequent goods are stored in another storage space. These technical solutions resolve some problems to a certain extent, but all have their own disadvantages.

As for the solution of specifying the maximum goods storage quantity of a storage space, the storage quantity of the storage space can only be roughly estimated by warehouse managers depending on their experience, and cannot fully represent the actual status. Information such as size, volume, and weight of goods all directly affects the maximum quantity of goods that can be stored in a storage space. For example, a storage space can store 20 pairs of shoes, but the quantity may reach 100 if storing clothes. Obviously, the solution of specifying a maximum goods storage quantity of a storage space cannot fully utilize a storage capability of the storage space.

The solution of imposing limitation based on the volume of a storage space mainly shows a fixed storage capability of the storage space for different goods. However, volume maintenance for various goods, especially soft clothes, towels, and the like, is very difficult. Moreover, for a large warehouse, goods are transferred in and out in large quantities, and there are a huge number of goods categories, which causes immeasurable workload for keeping perfectly fine maintenance.

The solution of planning a storage space based on a maximum weight also has problems such as inaccurate storage space estimation, and difficulties in collecting information about goods of various categories well.

In addition, in these existing storage space planning solutions, during storage space planning, goods storage is defined based on only some characteristics of a storage space, without considering the storage attribute parameter of goods, nor considering the impact caused by a change of goods in the warehouse to the planning.

In conclusion, the existing methods for warehouse storage space planning still cannot systematically utilize the storage capability of a storage space in a warehouse and flexibly and accurately plan a storage space for goods depending on the actual status of a warehouse goods change, and have problems such as low efficiency.

SUMMARY

This disclosure provides a method for warehouse storage space planning, which can flexibly and accurately plan for goods depending on an actual status of a warehouse goods change. This disclosure also provides a device for warehouse storage space planning, and an electronic device for warehouse storage space planning.

According to one aspect, a method for warehouse storage space planning includes: obtaining warehouse goods change information of a predetermined time period and current storage space utilization information of a warehouse, where the predetermined time period is a future time period (e.g., starting from a current time point to a future time point); extracting goods identifier and a quantity of goods to be stored within the predetermined time period from the warehouse goods change information of the predetermined time period; determining a storage attribute parameter of the goods to be stored within the predetermined time period based on the goods identifier of the goods to be stored within the predetermined time period; and determining a preset storage space in the warehouse for the goods to be stored within the predetermined time period based on a the storage attribute parameter of the goods to be stored within the predetermined time period, the quantity of the goods to be stored within the predetermined time period, and the current storage space utilization information of the warehouse.

Optionally, the warehouse goods change information of the predetermined time period is obtained in the following manner: obtaining data of a goods storage or delivery-related notice to be processed within the predetermined time period.

Optionally, the goods storage or delivery-related notice includes one or more of the following: a return notice, a receiving notice, a delivery notice, and a sales order.

Optionally, obtaining the current storage space utilization information of the warehouse includes: obtaining the current storage space utilization information of the warehouse based on a warehouse storage space record of a warehouse system management platform, where the storage space utilization information includes location and quantity information and capacity and load information of an idle and available storage space; or obtaining the current storage space utilization information of the warehouse based on storage space status information transferred from a warehouse goods positioning system, where the storage space utilization information includes location and quantity information and capacity and load information of an idle and available storage space.

Optionally, the determining a storage attribute parameter of the goods to be stored within the predetermined time period based on the goods identifier of the goods to be stored within the predetermined time period includes the following steps: querying a network or a database for goods parameters of the goods based on the goods identifier of the goods to be stored within the predetermined time period; and obtaining or inducing the storage attribute parameter of the goods based on the obtained goods parameters, where the storage attribute parameter includes at least one of the following goods parameters: overall goods size and overall goods weight.

Optionally, the obtaining or inducing the storage attribute parameter of the goods based on the obtained goods parameters comprises: directly obtaining the storage attribute parameter from the goods parameters.

Optionally, inducing the storage attribute parameter of the goods includes: obtaining, from a database, data of goods with a known storage attribute parameter as sample data; obtaining, through learning via a machine learning algorithm by using goods parameters of the sample data, a storage attribute parameter calculation model; determining goods for which the storage attribute parameter needs to be induced, and obtaining the goods parameters of the goods; and substituting the goods parameters into the storage attribute parameter calculation model to induce the storage attribute parameter of the goods.

Optionally, the machine learning algorithm includes a neural network model algorithm.

Optionally, the determining a preset storage space in the warehouse for the goods to be stored within the predetermined time period comprises determining the preset storage space in the warehouse for the goods to be stored within the predetermined time period according to a preset rule; and the preset rule includes: the storage attribute parameter of the goods to be stored within the predetermined time period for which a space needs to be arranged matches a storage space attribute of the preset storage space.

Optionally, the preset rule further includes at least one of the following: goods of a same brand are stored in neighboring storage spaces, or goods of a same owner are stored in neighboring storage spaces, or goods of a same category are stored in neighboring storage spaces.

Optionally, the preset storage space includes a plurality of alternative storage spaces; and during a process of entering the goods to the warehouse for storing, the storing is arranged in a recommended sequence, and if a selected alternative storage space has been occupied, a next alternative storage space is used.

Optionally, the method further comprises, during the process of entering the goods to the warehouse for storing, when the preset storage space is occupied, re-planning a storage space in the warehouse based on the warehouse goods change information of the current predetermined time period and current storage space utilization information of the warehouse, and determining a new preset storage space for the goods to be stored within the predetermined time period based on a planning result.

Correspondingly, according to another aspect, a device for warehouse storage space planning includes the following units: an obtaining unit, configured to obtain warehouse goods change information of a predetermined time period and current storage space utilization information of a warehouse, where the predetermined time period is a future time period starting (e.g., from a current time point to a future time point); an extraction unit, configured to extract goods identifier and a quantity of goods to be stored within the predetermined time period from the warehouse goods change information of the predetermined time period; a storage attribute parameter determining unit, configured to determine a storage attribute parameter of the goods to be stored within the predetermined time period based on the goods identifier of the goods to be stored within the predetermined time period; and a storage space planning unit, configured to determine a preset storage space in the warehouse for the goods to be stored within the predetermined time period based on the storage attribute parameter of the goods to be stored within the predetermined time period, the quantity of the goods to be stored within the predetermined time period, and the current storage space utilization information of the warehouse.

Optionally, the obtaining, by the obtaining unit, current storage space utilization information of the warehouse includes: obtaining the current storage space utilization information of the warehouse based on a warehouse storage space record of a warehouse system management platform, where the storage space utilization information includes location and quantity information and capacity and load information of an idle and available storage space; or obtaining the current storage space utilization information of the warehouse based on storage space status information transferred from a warehouse goods positioning system, wherein the storage space utilization information comprises location and quantity information and capacity and load information of an idle and available storage space.

Optionally, the storage attribute parameter determining unit includes a goods parameter obtaining subunit, configured to query a network or a database for goods parameters of the goods based on the goods identifier of the goods to be stored within the predetermined time period; and a storage attribute parameter determining subunit, configured to obtain or induce the storage attribute parameter of the goods based on the obtained goods parameters, where the storage attribute parameter includes at least one of the following goods parameters: overall goods size and overall goods weight.

Optionally, the storage attribute parameter determining subunit includes: a sample data obtaining subunit, configured to obtain, from a database, data of goods with a known storage attribute parameter as sample data; a calculation model subunit, configured to obtain, through learning via a machine learning algorithm by using goods parameters of the sample data, a storage attribute parameter calculation model; and an inducing subunit, configured to substitute the goods parameters into the storage attribute parameter calculation model, to induce the storage attribute parameter of the goods.

Optionally, a machine learning algorithm used by the calculation model subunit is a neutral network model algorithm.

According to another aspect, an electronic device includes: an arithmetic logical unit, a storage device, an input device, and an output device and a controller, where the storage device stores a program, and when the program is executed, the methods for warehouse storage space planning as discussed above can be performed.

According to another aspect, a device for warehouse storage space planning, comprises a processor and a non-transitory computer-readable storage medium storing instructions that, when execute by the processor, cause the processor to perform a method for warehouse storage space planning, the method comprising: obtaining warehouse goods change information of a predetermined time period and current storage space utilization information of a warehouse, wherein the predetermined time period is a future time period; extracting goods identifier and a quantity of goods to be stored within the predetermined time period from the warehouse goods change information of the predetermined time period; determining a storage attribute parameter of the goods to be stored within the predetermined time period based on the goods identifier of the goods to be stored within the predetermined time period; and determining a preset storage space in the warehouse for the goods to be stored within the predetermined time period based on the storage attribute parameter of the goods to be stored within the predetermined time period, the quantity of the goods to be stored within the predetermined time period, and the current storage space utilization information of the warehouse.

According to another aspect, a non-transitory computer-readable storage medium storing instructions that, when execute by a processor, cause the processor to perform a method for warehouse storage space planning, the method comprising: obtaining warehouse goods change information of a predetermined time period and current storage space utilization information of a warehouse, wherein the predetermined time period is a future time period; extracting goods identifier and a quantity of goods to be stored within the predetermined time period from the warehouse goods change information of the predetermined time period; determining a storage attribute parameter of the goods to be stored within the predetermined time period based on the goods identifier of the goods to be stored within the predetermined time period; and determining a preset storage space in the warehouse for the goods to be stored within the predetermined time period based on the storage attribute parameter of the goods to be stored within the predetermined time period, the quantity of the goods to be stored within the predetermined time period, and the current storage space utilization information of the warehouse.

Compared with the prior art, the disclosed systems and methods have the following advantages: based on warehouse goods change information of a future time period, by comprehensively considering a storage attribute parameter of goods, a quantity of the goods, and an actual status of a storage space in a warehouse, a storage space is planned based on a preset rule, thereby resolving problems of existing methods for warehouse storage space planning, in which goods storage is defined based on only some characteristics of a storage space, without considering an upcoming warehouse goods change.

In the technical solutions of this disclosure, a storage space is planned for goods to be stored within the predetermined time period based on a preset rule in combination with a storage attribute parameter of the goods, a quantity of the goods, warehouse goods change information of a future time period, and an actual status of a storage space in a warehouse. This can systematically utilize a storage capability of the storage space in the warehouse, and flexibly and accurately plan the storage space for the goods to be stored within the predetermined time period, thereby improving the efficiency.

DETAILED DESCRIPTION

In the following description, specific details are set forth for fully understanding this application. However, this disclosure can be implemented in many other ways different from those described herein, and those skilled in the art can make similar inferences without departing from the content of this disclosure. Therefore, this disclosure is not limited to the specific implementations disclosed below.

Figure 1:
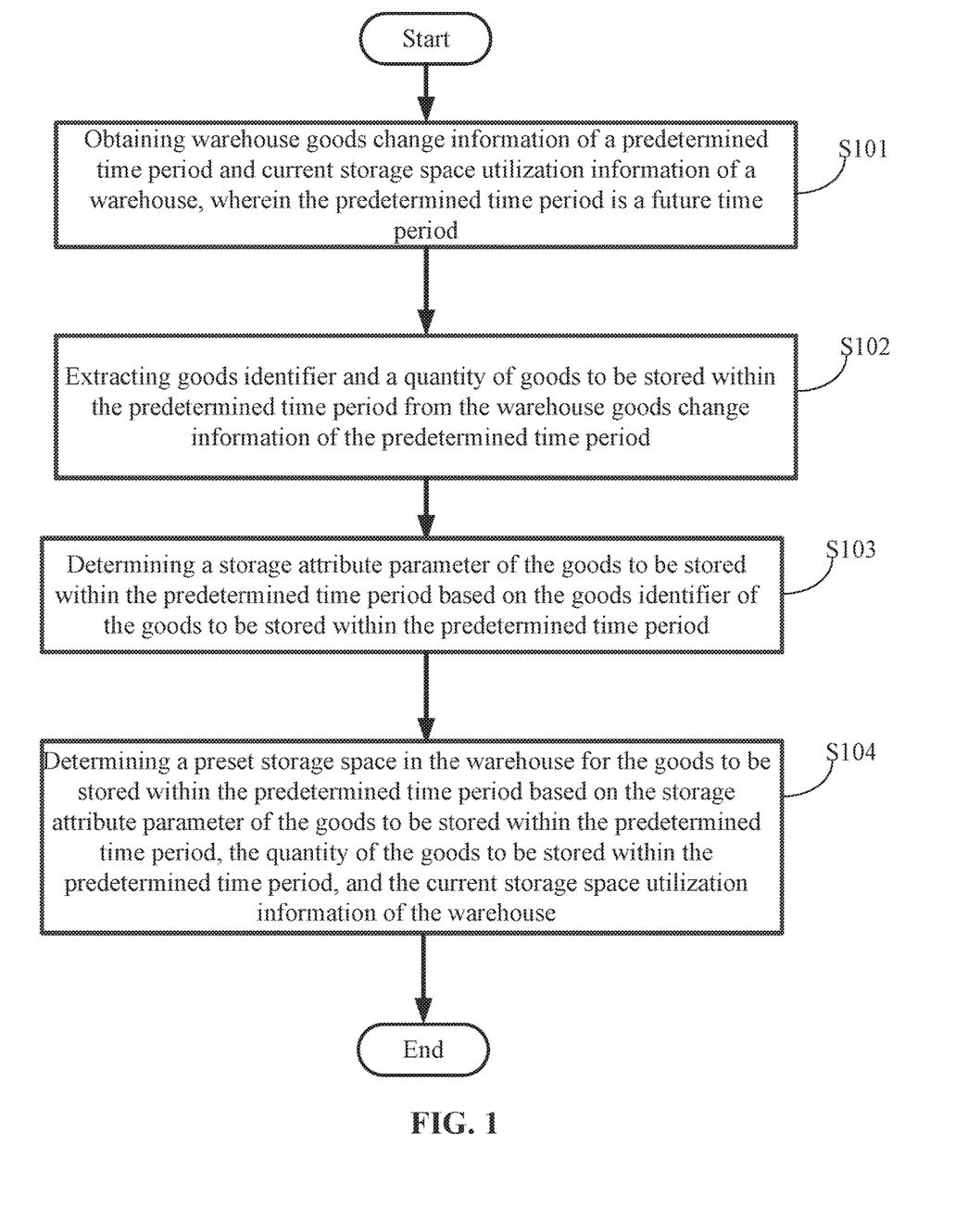
FIG. 1 is a schematic flowchart of a method for warehouse storage space planning according to various embodiments of this disclosure.

In some embodiments, this disclosure provides a method for warehouse storage space planning, a schematic flowchart of which is shown in FIG. 1. This method includes the following steps:

Step S101. Obtaining warehouse goods change information of a predetermined time period and current storage space utilization information of a warehouse, wherein the predetermined time period is a future time period.

In some embodiments, this step is intended to obtain related information for warehouse storage space planning.

The warehouse goods change information mainly refers to storage and delivery information of warehouse goods. The storage space utilization information is a utilization status of a storage space in the warehouse, for example, whether it is occupied or idle; if being occupied, whether it is totally occupied or partially occupied.

The warehouse goods constantly change. These changes mainly include entering goods to warehouse for storing and shipping goods out of warehouse for delivery. A status of a storage space in the warehouse varies with these changes. If a storage space in the warehouse is to be planned, possible warehouse goods change information of a future time period, as well as current storage space utilization information, need to be learned in advance to properly plan the storage space in the warehouse based on the warehouse goods change information of the future time period and the current storage space utilization information.

The predetermined time period is a time period determined depending on a planning requirement and starting from a current time point to a future time point. The time period has a determinate future time point. In some embodiments, the predetermined time period needs to be set so that the warehouse goods change information can be obtained relatively accurately. For example, "starting from a current time point to the same time point of tomorrow" is a selectable and proper predetermined time period; correspondingly, warehouse goods change information of the predetermined time period is warehouse goods change information within 24 hours.

The warehouse goods change information has different information sources in specific circumstances. In some embodiments, the warehouse goods change information mainly refers to various electronic information collected from a logistics platform and transferred through a network, for example, a receiving notice, a storage notice, a return notice, and a sales order in an electronic form; and may also include notices manually entered into a warehouse management platform. These notices may be referred to as to-be-processed goods storage or delivery-related notices. These notices are used as mandatory notices for storing or delivering goods, which involve certain time ahead of a current time point, and record goods to be entered into the warehouse within a future time period and goods to be delivered from the warehouse within the future time period, from which the warehouse goods change information can be obtained. Therefore, a storage space in the warehouse can be planned based on the records in these notices in combination with the current storage space utilization information of the warehouse.

An exemplary instance is used below to describe the storage or delivery-related notices. It is assumed that the current time point is 00:00 on December 01, and the predetermined time period is 72 hours starting from the current time point.

Using the woolen overcoat with the goods barcode 3DH983B4394240 as an example, according to the record in the receiving notice, seventeen woolen overcoats will be received and entered to the warehouse for storing; according to the record in the return notice, one woolen overcoat will be returned and entered to the warehouse for storing; according to the record in the sales order, one woolen overcoat will be delivered from the warehouse for a sales transaction.

In some embodiments, from the obtained notices, various information of the to-be-stored and to-be-delivered goods can be obtained. Warehouse goods change information can be accurately obtained from these notices in a well-grounded way, and inaccuracy caused by empirical estimation is avoided.

The storage space utilization information records a status of a storage space in the warehouse. Because the status of the storage space in the warehouse keeps changing, storage space utilization information at a current time point, that is, the current storage space utilization information of the warehouse, is significant in warehouse storage space planning. The information may be used as a basis for warehouse storage space planning. The warehouse storage space planning is arranging a storage space in the warehouse based on the current storage space utilization information of the warehouse in combination with the warehouse goods change information of the predetermined time period.

In the storage space planning method in this disclosure, the current storage space utilization information of the warehouse mainly includes: location and quantity information and capacity and load information of an idle and available storage space, and the like. An exemplary instance

| Receiving notice (entering warehouse for storage): goods barcode | Goods name | Goods brand | Notification quantity | Intact/defective attribute | Status | Notification date |
|---|---|---|---|---|---|---|
| R15YR475HYR4S | Fashionable knitwear | RUI-RUI/Zhang Lei | 6 | Intact | Notification | December 02 |
| R15YR296HYCS | Knitted pullover sweater | RUI-RUI/Zhang Lei | 3 | Intact | Notification | December 02 |
| 3DH983B4394240 | Woolen overcoat | Lagogo/Lagogo | 17 | Intact | Notification | December 01 |

Return notice (entering warehouse for storage):

| Goods barcode | Goods name | Transaction desk number | Notification quantity | Status | Notification date |
|---|---|---|---|---|---|
| 356C26388593 | Jeans | 14633840121***** | 1 | Notification | December 01 |
| X15D508500139 | MINIGiRL2015 Women's shoes | 13073226079***** | 1 | Notification | December 01 |
| 3DH983B4394240 | Woolen overcoat | 14701496379***** | 1 | Notification | December 01 |

Sales order (leaving warehouse for delivery):

| Goods barcode | Order number | Notification quantity | Status | Notification date |
|---|---|---|---|---|
| 3DH983B4394240 | LBX0328212315***** | 1 | Notification | December 03 |
| 684983320304 | LBX0328212242***** | 1 | Notification | December 03 |
| 12512007S16175 | LBX0328212242***** | 1 | Notification | December 03 | is used below to describe the record in the current storage space utilization information of the warehouse:

| Goods barcode | Goods name | Storage space | Storage quantity | Capacity (m³) of the storage space | Load (kg) of the storage space |
|---|---|---|---|---|---|
| R15YR475HYR4S | Fashionable knitwear | B6C-017-03-24 | 10 | 0.21 | 20 |
| 12512007S16175 | Dark-grey jacket | A6A-038-01-21 | 1 | 0.21 | 20 |
| 3DH983B4394240 | Woolen overcoat | P-D2-006-07-12 | 3 | 0.21 | 20 |
| | | P-D2-006-07-13 | | 0.21 | 20 |

It can be learned from the obtained current storage space utilization information of the warehouse, the woolen overcoats with the goods barcode 3DH983B4394240 in the warehouse are stored in a storage space P-D2-006-07-12 and with a quantity of 3, the storage space P-D2-006-07-12 can store 0.21 m³ goods, and a neighboring storage space P-D2-006-07-13 is an empty storage space.

There may be a plurality of methods for obtaining the current storage space utilization information of the warehouse. This disclosure provides the following two exemplary obtaining methods:

Method 1: The current storage space utilization information of the warehouse is obtained based on a warehouse storage space record of a warehouse system management platform. Most warehouse system management platforms maintain the data of an actual use status of a storage space in a warehouse, including a location, a parameter, whether goods are stored, related information of the stored goods, and the like of each storage space. Location and quantity information of a currently idle and available storage space, capacity and load information of the storage space, and the like can be accurately obtained from the data.

Method 2: The current storage space utilization information of the warehouse is obtained based on storage space status information transferred from a warehouse goods positioning system. For a warehouse equipped with a positioning system, the positioning system can transfer a utilization status of a storage space to a warehouse system management platform in real time. Therefore, the storage space utilization information may be directly obtained from the positioning system in a more timely way. The positioning system may transfer the storage space utilization information to the warehouse goods positioning system by means of short-distance communication such as Bluetooth in combination with a sensor on the storage space.

Step S102. Extracting goods identifier and a quantity of goods to be stored within the predetermined time period (the to-be-stored goods) from the warehouse goods change information of the predetermined time period.

After the warehouse goods change information of the predetermined time period is obtained, a goods identifier, for example, a two-dimensional code, a one-dimensional code, or a character combination, is extracted therefrom. The two-dimensional code or the one-dimensional code is a character combination after translation. Goods having the same goods identifier are considered as the same goods. A quantity of each type of goods is counted.

For example, for the woolen overcoat, its goods identifier is the goods barcode 3DH983B4394240, and it can be learned based on the goods identifier and the goods storage or delivery-related notices that, 17+1 woolen overcoats are to be stored and one is to be delivered within the future time period. It can be learned by synthesizing the notices that, a quantity of woolen overcoats for which a storage space needs to be planned is 17. Identifying goods by using a goods identifier is more accurate and efficient than a manner using a goods name.

Step S103. Determining a storage attribute parameter of the goods to be stored within the predetermined time period based on the goods identifier of the to-be-stored goods.

Based on the goods identifier, related parameters of the goods may be determined from a plurality of information sources such as specifications and nameplates of the goods. These parameters may be referred to as goods parameters, for example, weight and size of the goods.

However, a storage attribute parameter is significant for warehouse storage space planning. The storage attribute parameter is used to represent a status of a storage space occupied by goods and a goods attribute to be obtained for storage space planning, for example, an overall goods size including packaging, an overall goods weight including packaging, and other storage-related goods properties. The following separately describes these storage attribute parameters in detail.

In this disclosure, an overall goods size refers to a goods size including packaging, and size and volume may be considered as substantially the same concepts. Since size includes goods length, width, height, and other information, and can be used for better storage space planning, size is mainly used in this disclosure.

Similarly, in this disclosure, an overall goods weight refers to a goods weight including the packaging.

As for the storage-related goods properties, for example, goods belonging to fresh food may need a freezing space; goods belonging to textile probably may not be placed next to goods containing much moisture.

The storage attribute parameter sometimes may or may not be directly obtained from goods information obtainable from the goods identifier. For example, a size of a refrigerator may be obtained by querying parameters of the refrigerator based on its goods identifier, but when the refrigerator is stored in a warehouse, packaging is included, and an overall goods size including the packaging is more significant in warehouse storage space planning. Therefore, attributes of the goods need to be obtained from the goods identifier, and then the storage attribute parameter of the goods is induced based on the attributes of the goods.

For another example, a weight of a refrigerator may be obtained by querying parameters of the refrigerator based on its goods identifier, but when the refrigerator is to be stored in a warehouse, an overall refrigerator weight including packaging needs to be considered, which may need to be induced.

The storage attribute parameter of the goods to be stored within the predetermined time period may be determined based on the goods identifier of the to-be-stored goods in the following manner:

First, a system database is queried to obtain goods parameters of the goods, including weight, size (or volume), goods type, owner, supplier, manufacturer, production date, shelf life, destination, material, fragility, value, hazardousness, whether it is warranted, whether it is moisture sensitive, registered trademark, whether it is imported, and the like. These goods parameters can fully represent the attributes of the goods, and provide sufficient information for subsequent processing.

The storage attribute parameter required for planning a storage space for the goods is obtained or induced based on the obtained goods parameters. The goods storage attribute parameter is used to represent a status of a storage space occupied by goods.

Depending on a storage space planning requirement, a goods storage attribute parameter may include an overall goods size, an overall goods weight, or the like. The overall goods volume and/or the overall goods weight may be used as goods storage attribute parameters depending on actual statuses of goods and storage spaces.

Still using the woolen overcoat as an example, its goods identifier is the goods barcode 3DH983B4394240, and a storage attribute parameter of the goods is obtained by querying a goods database of a goods transaction platform based on the goods identifier.

Goods parameters, including weight, size, goods type, owner, supplier, manufacturer, production date, shelf life, destination, material, fragility, value, hazardousness, whether it is warranted, whether it is moisture sensitive, registered trademark, whether it is imported, and the like, of the woolen overcoat may be obtained by querying the goods database.

Because the woolen overcoat is relatively lightweight while a storage space has a relatively large load, a goods volume is used as the storage attribute parameter of the woolen overcoat.

There may be a plurality of methods for obtaining or inducing, based on these obtained goods parameters, a storage attribute parameter required for planning a storage space for the goods. This disclosure provides the following two exemplary methods:

Method 1: If the goods parameters include the storage attribute parameter, the storage attribute parameter is directly obtained and used.

It can be learned from the description above that, in most cases, the goods parameters obtained from the goods database or other databases do not include a goods storage attribute. For example, the goods parameters of the woolen overcoat do not include the storage attribute parameter, such as the overall goods volume, required for planning a storage space. Then the following Method 2 may be used for inducing.

Method 2: If the goods parameters do not include a storage attribute parameter, for example, only the weight of the woolen overcoat can be obtained, but its volume cannot be obtained, and if a storage space in a warehouse needs to be planned based on its volume, the following manner is used:

Data of goods with a known storage attribute parameter is obtained from a system-maintained database as sample data. A goods storage attribute calculation model for inducing goods storage attribute parameter based on goods parameters is obtained through learning via a machine learning algorithm based on goods parameters of the sample data.

Using the woolen overcoat as an example, because the storage attribute parameter, that is, the goods volume, required for planning a storage space for the woolen overcoat is unknown, data of some or all goods with known goods volumes needs to be obtained from the system-maintained database as sample data, and a calculation model for inducing a goods volume by using goods parameters is obtained through learning via a machine learning algorithm by using goods parameters of the goods with known goods volumes, that is, weight, size, goods type, owner, supplier, manufacturer, production date, shelf life, destination, material, fragility, value, hazardousness, whether it is warranted, whether it is moisture sensitive, registered trademark, whether it is imported, and the like of the goods with known goods volumes.

There are a plurality of machine learning algorithms, for example, a decision tree-based algorithm, an instance-based method, and a regularization method. In this application, a learning algorithm based on a computer neutral network is used. The algorithm learns based on an interactive reaction of a simulated biological neural system to a real-world object, and is suitable for processing a large amount of goods parameter data.

In some embodiments, data of goods with a known storage attribute parameter, that is, goods with a known goods volume, is used as sample data. The data of the goods includes goods parameters and the storage attribute parameter of the goods. The goods parameters include weight, size, goods type, owner, supplier, manufacturer, production date, shelf life, destination, material, fragility, value, hazardousness, whether it is warranted, whether it is moisture sensitive, registered trademark, whether it is imported, and the like. The storage attribute parameter of the goods is the goods volume. A computer neutral network is trained by using the data, to obtain a storage attribute parameter calculation model through learning and calculation.

The computer neutral network is a computer multi-layer neutral network. The goods parameters, that is, weight, size, goods type, owner, supplier, manufacturer, production date, shelf life, destination, material, fragility, value, hazardousness, whether it is warranted, whether it is moisture sensitive, registered trademark, whether it is imported, and the like, of the goods in the sample data are used as an external input of the multi-layer neutral network, an actual storage attribute parameter of the sample data is used as a calculation result reference value, to train a calculation model of the multi-layer neutral network. The multi-layer neutral network is a mature machine learning algorithm, and is not detailed herein.

An exemplary training process is provided as follows. First, necessary initialization is performed. For example, computer neutral network-related parameters, such as a quantity of layers of the computer neutral network, a quantity of neurons, and an output weight of each neuron, are set. Then, necessary preprocessing, such as normalization and setting an initial value, is performed for data, and a neutral network training end condition (for example, an error is within a preset range or a number of times for training reaches a preset number for stopping training) is set.

Preprocessed goods parameters are obtained based on the sample data as an external input of the neutral network. A calculation model for a particular goods storage attribute, such as an overall goods volume, is obtained through executing the neural network. A storage attribute parameter, that is, the overall goods volume, corresponding to a sample is calculated via the calculation model by using the goods parameters of the sample data.

The storage attribute parameter, that is, the induced overall goods volume, obtained via the calculation model is compared with the actual goods storage attribute parameter, that is, an actual overall goods volume, in the sample data to obtain an error.

In this case, it is determined whether the preset neutral network training end condition is satisfied. The preset neutral network training end condition includes that the error is within the preset range.

If the preset neutral network training end condition is satisfied, neutral network-related parameters in this case, such as a quantity of layers, a quantity of neurons, and an output weight of each neuron, are recorded and determined as computer neutral network-related parameters, and a goods storage attribute calculation model is determined based on these parameters. Then the training process ends.

If the preset neutral network training end condition is not satisfied, a necessary adjustment is made to the neutral network-related parameters based on the error, and an error is re-calculated by using the sample data, and so on, until the preset neutral network training end condition is satisfied.

The properness of the method for obtaining a storage attribute parameter calculation model may be briefly described as follows. A goods attribute, an overall goods volume, and an overall goods weight of each type of stored goods are related to a certain extent. For example, a goods material attribute, a goods type, and a goods manufacturer may be all related to the overall goods weight Chemical fiber material fabric and woolen fabric of the same volume have different weights. Goods types of sportswear and formal wear of the same volume also have different weights. For fabric of the same material and the same type, different brands also have different weights. Therefore, various goods parameters may be all significant in inducing a goods storage attribute. With the storage attribute calculation model, degrees of impact of goods attributes to a to-be-induced goods storage attribute are obtained based on the sample data, corresponding weights are obtained, and finally a proper model is obtained, to properly induce a goods storage attribute parameter.

The following describes a process of calculating a storage attribute of an exemplary type of goods by using the storage attribute parameter calculation model in a case where the storage attribute parameter calculation model has been obtained through training by using the sample data.

Goods for which a storage attribute parameter needs to be induced, that is, goods whose goods parameters do not include a goods storage attribute parameter, are determined, and the goods parameters of the goods are obtained.

The storage attribute parameter calculation model obtained through training by using the sample data and corresponds to a to-be-induced storage attribute is obtained. For example, if the to-be-induced storage attribute is the overall goods volume, an overall volume calculation model is used; if the to-be-induced storage attribute is the overall goods weight, an overall weight calculation model is used.

The goods parameters are provided to the storage attribute parameter calculation model, to obtain an induced result from the storage attribute parameter calculation model.

In some embodiments, the woolen overcoat mentioned above is used as an example for description.

For example, the goods parameters of the woolen overcoat, that is, data such as weight, size, goods type, owner, supplier, manufacturer, production date, shelf life, destination, material, fragility, value, hazardousness, whether it is warranted, whether it is moisture sensitive, registered trademark, whether it is imported, and the like of the woolen overcoat are provided to the overall volume calculation model in the storage attribute parameter calculation model obtained through training by using the foregoing method, to obtain an overall goods volume of the woolen overcoat via the model. For example, in this case, the obtained volume of the woolen overcoat is 0.02 $m^3$.

Step S104. Determining a preset storage space in the warehouse for the goods to be stored within the predetermined time period based on the storage attribute parameter of the goods to be stored within the predetermined time period, the quantity of the to-be-stored goods, and the current storage space utilization information of the warehouse, for example, according to a preset rule.

In some embodiments, the goods storage attribute parameter, that is, the goods volume, of the woolen overcoat is 0.02 $m^3$, and it is learned from the storage or delivery-related notices (that is, one return notice for storage, seventeen receiving notices for storage, and one notice for delivery) of the woolen overcoat obtained in step S101 that, a quantity of woolen overcoats for which a storage space needs to be planned is 17; the current storage space utilization information of the warehouse indicates that the woolen overcoats are stored in the storage space P-D2-006-07-12 and with a quantity of 3, the storage space P-D2-006-07-12 can store 0.21 $m^3$ goods, and the neighboring storage space P-D2-006-07-13 is an empty storage space.

Similarly to the woolen overcoat, the preset storage space in the warehouse is determined for other to-be-stored goods based on a preset rule in combination with a storage attribute parameter and a quantity of the to-be-stored goods and the current storage space utilization information of the warehouse that are obtained in the foregoing steps.

In some embodiments, the rule includes that a goods storage attribute parameter matches an attribute of a preset storage space in a warehouse (for example, a volume or a weight of the storage space is greater than that of to-be-stored goods, and the difference is within a preset range). For the woolen overcoat in this example, if only a capacity, that is, the volume, of a storage space is considered based on this rule, the storage space P-D2-006-07-12 can store a maximum of 10 woolen overcoats, that is, the storage space can store seven of the to-be-stored woolen overcoats, and the other to-be-stored woolen overcoats may be stored in any idle storage space in the warehouse.

Further, on the basis that the goods storage attribute parameter matches the attribute of the preset storage space in the warehouse, another rule may be set, for example, goods of the same category are stored in neighboring storage spaces (based on this rule, the ten woolen overcoats other than the seven woolen overcoats stored in the storage space P-D2-006-07-12 are stored in the neighboring storage space P-D2-006-07-13); goods of the same brand are stored in neighboring storage spaces, or goods of the same owner are stored in neighboring storage spaces. In this way, a storage space can be more flexibly planned for goods.

For goods requiring more than one goods storage attribute parameter, a corresponding rule needs to be set for each goods storage attribute parameter, thereby planning a storage space more properly and flexibly for the goods without neglection.

In the method for warehouse storage space planning according to the described embodiments, the preset storage space may include a plurality of alternative storage spaces. During the actual process of entering the goods to warehouse for storing, the storing is implemented in a recommended sequence, and if a selected alternative storage space has been occupied, a next alternative storage space is used. Alternatively, a new storage space is preset for the goods by using the method for warehouse storage space planning according to the described embodiments.

For example, for the to-be-stored woolen overcoats, in addition to the storage space P-D2-006-07-12 and the storage space P-D2-006-07-13, any idle storage space is also planned as an alternative storage space to store the woolen overcoats. During the actual process of entering the goods to warehouse for storing, if it is found that the storage space P-D2-006-07-13 has been occupied by other goods because an accidental change occurs after planning is performed by using the method in the described embodiments, or planning is not performed by using the method in the described embodiments, the ten woolen overcoats other than the seven woolen overcoats stored in the storage space P-D2-006-07-12 cannot be stored in the neighboring storage space P-D2-006-07-13. In this case, the ten woolen overcoats may be stored in the alternative storage space, that is, any idle storage space. Alternatively, a new storage space is planned for the ten woolen overcoats by using the storage space planning method according to the above embodiments.

In this way, a preset storage space can be provided for goods in time depending on an actual status of goods storage.

The foregoing describes embodiments of a method for warehouse storage space planning. The method can systematically utilize a storage capability of a storage space in a warehouse and flexibly and accurately plan a storage space for to-be-stored goods depending on an actual status of a warehouse goods change, thereby improving the efficiency.

Figure 2:
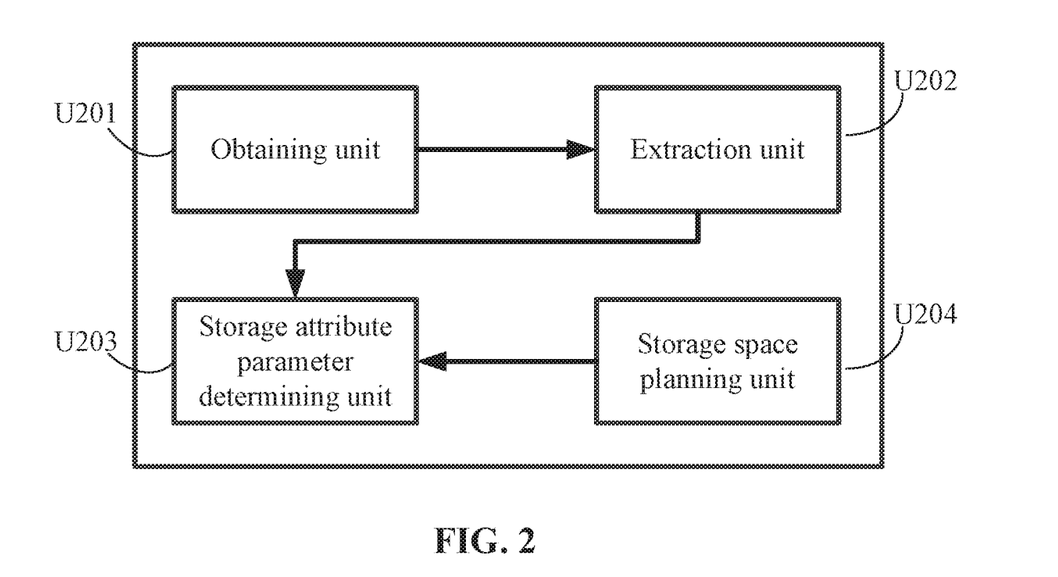
FIG. 2 is a structural block diagram of a device for warehouse storage space planning according to various embodiments of this disclosure.

Correspondingly, embodiments of this disclosure provide a device for warehouse storage space planning, a structural block diagram of which is shown in FIG. 2. The device includes the following units: an obtaining unit U201, an extraction unit U202, a storage attribute parameter determining unit U203, and a storage space planning unit U204.

The obtaining unit U201 is configured to obtain warehouse goods change information of a predetermined time period and current storage space utilization information of a warehouse, where the predetermined time period is a future time period.

After obtaining the warehouse goods change information of the predetermined time period (a future time period) and the current storage space utilization information of the warehouse, the obtaining unit U201 sends a start signal to the extraction unit U202, to instruct the extraction unit U202 to operate.

The extraction unit U202 is configured to extract a goods identifier of goods to be stored within the predetermined time period and a quantity of the to-be-stored goods from the warehouse goods change information of the predetermined time period.

After receiving the start signal sent by the obtaining unit U201, the extraction unit U202 extracts the goods identifier of the goods to be stored within the predetermined time period and the quantity of the to-be-stored goods from the warehouse goods change information of the predetermined time period.

The storage attribute parameter determining unit U203 is configured to receive an output from the extraction unit U202, and determine a storage attribute parameter of the goods to be stored within the predetermined time period based on the goods identifier of the to-be-stored goods.

After receiving the output from the extraction unit U202, the storage attribute parameter determining unit U203 determines the storage attribute parameter of the goods to be stored within the predetermined time period based on the goods identifier of the to-be-stored goods, and sends a start signal to the storage space planning unit U204, to instruct the storage space planning unit U204 to operate.

The storage space planning unit U204 is configured to determine a preset storage space in the warehouse for the goods to be stored within the predetermined time period based on the storage attribute parameter of the goods to be stored within the predetermined time period, the quantity of the to-be-stored goods, and the current storage space utilization information of the warehouse, for example, according to a preset rule.

After receiving the instruction signal sent by the storage attribute parameter determining unit U203, the storage space planning unit U204 determines the preset storage space in the warehouse for the goods to be stored within the predetermined time period based on a preset rule by synthesizing the storage attribute parameter of the goods to be stored within the predetermined time period, the quantity of the to-be-stored goods, and the current storage space utilization information of the warehouse.

In some embodiments, the various modules and/or units of the device in FIG. 2 may be implemented as software instructions. That is, the device shown in FIG. 2 may comprise a processor and a non-transitory computer-readable storage medium storing instructions that, when executed by the processor, cause one or more components of the device (e.g., the processor) to perform various steps and methods of the modules and/or units described above.

Figure 3:
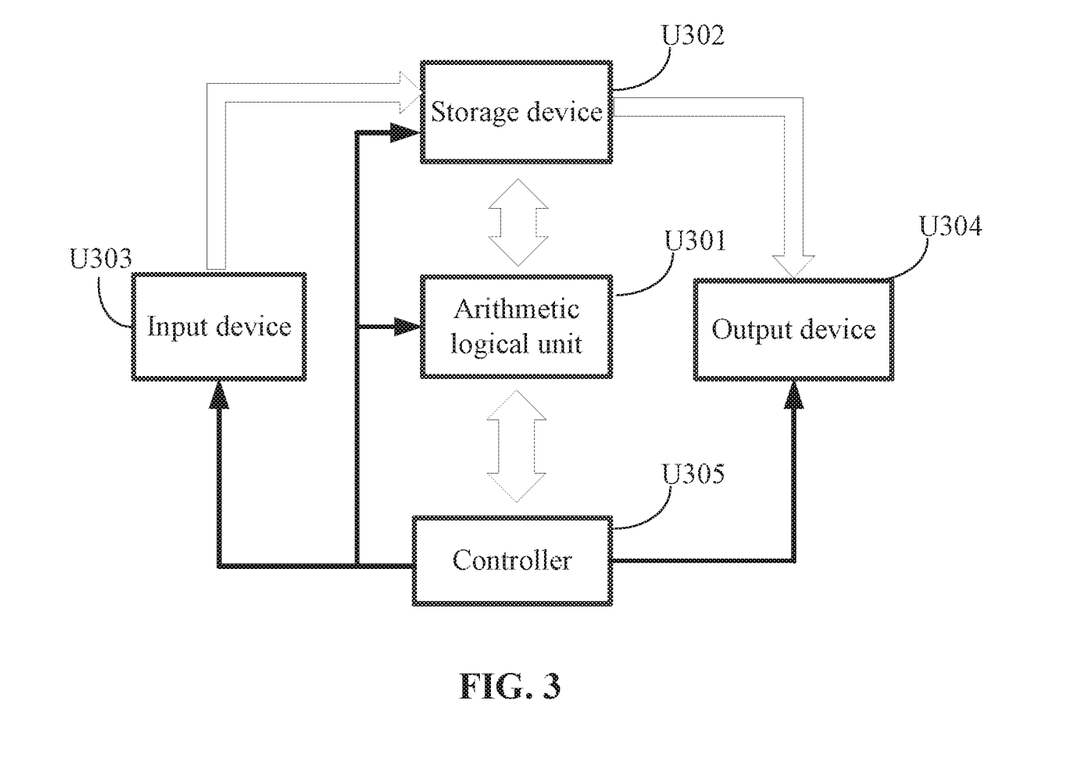
FIG. 3 is a schematic structural diagram of an electronic device for warehouse storage space planning according to various embodiments of this disclosure.

Embodiments of this disclosure further provide an electronic device for warehouse storage space planning, a schematic structural diagram of which is shown in FIG. 3.

The electronic device for warehouse storage space planning includes an arithmetic logical unit U301, a storage device U302, an input device U303, an output device U304, and a controller U305, where the storage device U302 stores a program, and when the program is executed, the following method for warehouse storage space planning can be performed:

obtaining warehouse goods change information of a predetermined time period and current storage space utilization information of a warehouse, where the predetermined time period is a future time period;

extracting a goods identifier of goods to be stored within the predetermined time period and a quantity of the to-be-stored goods from the warehouse goods change information of the predetermined time period;

determining a storage attribute parameter of the goods to be stored within the predetermined time period based on the goods identifier of the to-be-stored goods; and determining a preset storage space in the warehouse for the goods to be stored within the predetermined time period based on the storage attribute parameter of the goods to be stored within the predetermined time period, the quantity of the to-be-stored goods, and the current storage space utilization information of the warehouse, for example, according to a preset rule.

In some embodiments, the various modules and/or units of the device in FIG. 3 may be implemented as software instructions. That is, the device shown in FIG. 3 may comprise a processor and a non-transitory computer-readable storage medium storing instructions that, when executed by the processor, cause one or more components of the device (e.g., the processor) to perform various steps and methods of the modules and/or units described above.

The disclosed embodiments are not intended to limit this disclosure. Any person skilled in the art can make possible changes and modifications without departing from the spirit and scope of this disclosure. Therefore, the protection scope of this disclosure shall be subject to the scope defined by the claims of disclosure.

In a typical configuration, a computer device includes one or more processors (CPUs), an input/output interface, a network interface, and a memory.

The memory may include a volatile memory, a random access memory (RAM), and/or a non-volatile memory or the like in a computer-readable medium, for example, a read-only memory (ROM) or a flash RAM. The memory is an example of the computer-readable medium.

1. The computer-readable medium includes non-volatile and volatile media as well as movable and non-movable media, and can implement information storage by means of any method or technology. Information may be a computer-readable instruction, a data structure, and a module of a program or other data. A storage medium of a computer includes, for example but not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessed by the computing device. According to the definition in this specification, the computer-readable medium does not include transitory computer-readable media, such as a modulated data signal and carrier.

2. The embodiments of this disclosure may be provided as a method, a system, or a computer program product. Therefore, this disclosure may be implemented in the form of a complete hardware embodiment, a complete software embodiment, or an embodiment combining software and hardware. Moreover, this disclosure may be in the form of a computer program product implemented on one or more computer-usable storage media (including, but not limited to, a magnetic disk memory, a CD-ROM, an optical memory, and the like) including computer-usable program codes.

What is claimed is:

1. A method for warehouse storage space planning, comprising:
    obtaining, by a processor, warehouse goods change information of a predetermined time period and current storage space utilization information of a warehouse, wherein the predetermined time period is a future time period;
    extracting, by the processor, goods identifier and a quantity of goods to be stored within the predetermined time period from the warehouse goods change information of the predetermined time period;
    determining, by the processor, whether a storage attribute parameter of the goods to be stored within the predetermined time period is included in goods parameters of the goods to be stored within the predetermined time period;
    in response to determining that the storage attribute parameter of the goods to be stored within the predetermined time period is not included in goods parameters of the goods to be stored within the predetermined time period:
        querying, by the processor, a network or a database for goods parameters of the goods to be stored within the predetermined time period based on the goods identifier of the goods to be stored within the predetermined time period; and
        calling, by the processor, a storage attribute parameter calculation model to calculate the storage attribute parameter of the goods to be stored within the predetermined time period with the goods parameters, wherein the storage attribute parameter comprises at least one of: an overall goods size and an overall goods weight of the goods to be stored within the predetermined time period; and
    in response to determining that the storage attribute parameter of the goods to be stored within the predetermined time period is included in goods parameters of the goods to be stored within the predetermined time period or that the storage attribute parameter of the goods to be stored within the predetermined time period is obtained from the calculating, determining, by the processor, a preset storage space in the warehouse for the goods to be stored within the predetermined time period based on the storage attribute parameter of the goods to be stored within the predetermined time period, the quantity of the goods to be stored within the predetermined time period, and the current storage space utilization information of the warehouse.

2. The method for warehouse storage space planning according to claim 1, wherein the warehouse goods change information of the predetermined time period is obtained by:
    obtaining data of a goods storage notice or a delivery-related notice to be processed within the predetermined time period.

3. The method for warehouse storage space planning according to claim 2, wherein the goods storage notice or the delivery-related notice comprises one or more of the following: a return notice, a receiving notice, a delivery notice, and a sales order.

4. The method for warehouse storage space planning according to claim 1, wherein obtaining the current storage space utilization information of the warehouse comprises:
    obtaining the current storage space utilization information of the warehouse based on a warehouse storage space record of a warehouse system management platform, wherein the current storage space utilization information comprises location and quantity information and capacity and load information of an idle storage space and an available storage space; or
    obtaining the current storage space utilization information of the warehouse based on storage space status information transferred from a warehouse goods positioning system, wherein the current storage space utilization information comprises location and quantity information and capacity and load information of an idle storage space and an available storage space.

5. The method for warehouse storage space planning according to claim 1, wherein the storage attribute parameter calculation model is obtained by:
    obtaining, from a database, data of goods with a known storage attribute parameter as sample data; and
    obtaining, through learning via a machine learning algorithm by using goods parameters of the sample data, the storage attribute parameter calculation model.

6. The method for warehouse storage space planning according to claim 5, wherein the machine learning algorithm comprises a neural network model algorithm.

7. The method for warehouse storage space planning according to claim 1, wherein:

the determining a preset storage space in the warehouse for the goods to be stored within the predetermined time period comprises determining the preset storage space in the warehouse for the goods to be stored within the predetermined time period according to a preset rule; and the preset rule comprises: the storage attribute parameter of the goods to be stored within the predetermined time period for which a space needs to be arranged matches a storage space attribute of the preset storage space.

8. The method for warehouse storage space planning according to claim 7, wherein the preset rule further comprises at least one of the following: goods of a same brand are stored in neighboring storage spaces, or goods of a same owner are stored in neighboring storage spaces, or goods of a same category are stored in neighboring storage spaces.

9. The method for warehouse storage space planning according to claim 1, wherein the preset storage space comprises a plurality of alternative storage spaces; and during a process of entering the goods to the warehouse for storing, the storing is arranged in a recommended sequence, and if a selected alternative storage space has been occupied, a next alternative storage space is used.

10. The method for warehouse storage space planning according to claim 1, further comprising: during a process of entering the goods to the warehouse for storing, when the preset storage space is occupied, re-planning a storage space in the warehouse based on the warehouse goods change information of the predetermined time period and the storage space utilization information of the warehouse, and determining a new preset storage space for the to-be-stored goods based on a planning result.

11. A device for warehouse storage space planning, comprising a processor and a non-transitory computer-readable storage medium storing instructions that, when executed by the processor, cause the processor to perform operations comprising:

obtaining warehouse goods change information of a predetermined time period and current storage space utilization information of a warehouse, wherein the predetermined time period is a future time period;

extracting goods identifier and a quantity of goods to be stored within the predetermined time from the warehouse goods change information of the predetermined time period;

determining whether a storage attribute parameter of the goods to be stored within the predetermined time period is included in goods parameters of the goods to be stored within the predetermined time period;

in response to determining that the storage attribute parameter of the goods to be stored within the predetermined time period is not included in goods parameters of the goods to be stored within the predetermined time period:

querying a network or a database for goods parameters of the goods to be stored within the predetermined time period based on the goods identifier of the goods to be stored within the predetermined time period; and calling a storage attribute parameter calculation model to calculate the storage attribute parameter of the goods to be stored within the predetermined time period with the goods parameters, wherein the storage attribute parameter comprises at least one of: an overall goods size and an overall goods weight of the goods to be stored within the predetermined time period; and in response to determining that the storage attribute parameter of the goods to be stored within the predetermined time period is included in goods parameters of the goods to be stored within the predetermined time period or that the storage attribute parameter of the goods to be stored within the predetermined time period is obtained from the calculating, determining a preset storage space in the warehouse for the goods to be stored within the predetermined time period based on the storage attribute parameter of the goods to be stored within the predetermined time period, the quantity of the goods to be stored within the predetermined time period, and the current storage space utilization information of the warehouse.

12. The device for warehouse storage space planning according to claim 11, wherein the obtaining current storage space utilization information of the warehouse comprises:

obtaining the current storage space utilization information of the warehouse based on a warehouse storage space record of a warehouse system management platform, wherein the current storage space utilization information comprises location and quantity information and capacity and load information of an idle storage space and an available storage space; or obtaining the current storage space utilization information of the warehouse based on storage space status information transferred from a warehouse goods positioning system, wherein the current storage space utilization information comprises location and quantity information and capacity and load information of an idle storage space and an available storage space.

13. The device for warehouse storage space planning according to claim 11, wherein the storage attribute parameter calculation model is obtained by:

obtaining, from a database, data of goods with a known storage attribute parameter as sample data; and obtaining, through learning via a machine learning algorithm by using goods parameters of the sample data, the storage attribute parameter calculation model.

14. The device for warehouse storage space planning according to claim 11, wherein:

the determining a preset storage space in the warehouse for the goods to be stored within the predetermined time period comprises determining the preset storage space in the warehouse for the goods to be stored within the predetermined time period according to a preset rule; and the preset rule comprises: the storage attribute parameter of the goods to be stored within the predetermined time period for which a space needs to be arranged matches a storage space attribute of the preset storage space.

15. The device for warehouse storage space planning according to claim 14, wherein the preset rule further comprises at least one of the following: goods of a same brand are stored in neighboring storage spaces, or goods of a same owner are stored in neighboring storage spaces, or goods of a same category are stored in neighboring storage spaces.

16. A non-transitory computer-readable storage medium storing instructions that, when executed by a processor, cause the processor to perform operations comprising:

obtaining warehouse goods change information of a predetermined time period and current storage space utilization information of a warehouse, wherein the predetermined time period is a future time period;

extracting one or more goods identifier and a quantity of goods to be stored within the predetermined time period from the warehouse goods change information of the predetermined time period;

determining whether a storage attribute parameter of the goods to be stored within the predetermined time period is included in goods parameters of the goods to be stored within the predetermined time period;

in response to determining that the storage attribute parameter of the goods to be stored within the predetermined time period is not included in goods parameters of the goods to be stored within the predetermined time period:

querying a network or a database for goods parameters of the goods to be stored within the predetermined time period based on the goods identifier of the goods to be stored within the predetermined time period; and calling a storage attribute parameter calculation model to calculate the storage attribute parameter of the goods to be stored within the predetermined time period with the goods parameters, wherein the storage attribute parameter comprises at least one of: an overall goods size and an overall goods weight of the goods to be stored within the predetermined time period; and in response to determining that the storage attribute parameter of the goods to be stored within the predetermined time period is included in goods parameters of the goods to be stored within the predetermined time period or that the storage attribute parameter of the goods to be stored within the predetermined time period is obtained from the calculating, determining a preset storage space in the warehouse for the goods to be stored within the predetermined time period based on the storage attribute parameter of the goods to be stored within the predetermined time period, the quantity of the goods to be stored within the predetermined time period, and the current storage space utilization information of the warehouse.

17. The non-transitory computer-readable storage medium according to claim 16, wherein the obtaining current storage space utilization information of the warehouse comprises:

obtaining the current storage space utilization information of the warehouse based on a warehouse storage space record of a warehouse system management platform, wherein the current storage space utilization information comprises location and quantity information and capacity and load information of an idle storage space and an available storage space; or obtaining the current storage space utilization information of the warehouse based on storage space status information transferred from a warehouse goods positioning system, wherein the current storage space utilization information comprises location and quantity information and capacity and load information of an idle storage space and an available storage space.

18. The non-transitory computer-readable storage medium according to claim 16, wherein the storage attribute parameter calculation model is obtained by:

obtaining, from a database, data of goods with a known storage attribute parameter as sample data; and obtaining, through learning via a machine learning algorithm by using goods parameters of the sample data, the storage attribute parameter calculation model.

19. The non-transitory computer-readable storage medium according to claim 16, wherein:

the determining a preset storage space in the warehouse for the goods to be stored within the predetermined time period comprises determining the preset storage space in the warehouse for the goods to be stored within the predetermined time period according to a preset rule; and the preset rule comprises: the storage attribute parameter of the goods to be stored within the predetermined time period for which a space needs to be arranged matches a storage space attribute of the preset storage space.

20. The non-transitory computer-readable storage medium according to claim 19, wherein the preset rule further comprises at least one of the following: goods of a same brand are stored in neighboring storage spaces, or goods of a same owner are stored in neighboring storage spaces, or goods of a same category are stored in neighboring storage spaces.

* * * * *